(12) United States Patent
Dongbang et al.

(10) Patent No.: US 11,847,277 B2
(45) Date of Patent: Dec. 19, 2023

(54) TOUCH CIRCUIT AND METHOD FOR CONTROLLING TOUCH CIRCUIT

(71) Applicant: LX Semicon Co., Ltd., Daejeon (KR)

(72) Inventors: Sik Dongbang, Daejeon (KR); Moon Ho Jang, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/817,506

(22) Filed: Aug. 4, 2022

(65) Prior Publication Data

US 2023/0039061 A1  Feb. 9, 2023

(30) Foreign Application Priority Data

Aug. 4, 2021  (KR) .................. 10-2021-0102612

(51) Int. Cl.
*G06F 3/041* (2006.01)
*G06F 3/044* (2006.01)

(52) U.S. Cl.
CPC ........ *G06F 3/04166* (2019.05); *G06F 3/0412* (2013.01); *G06F 3/04162* (2019.05); *G06F 3/04164* (2019.05); *G06F 3/044* (2013.01); *G06F 2203/04101* (2013.01)

(58) Field of Classification Search
CPC ............... G06F 3/04166; G06F 3/0412; G06F 3/04162; G06F 3/04164; G06F 3/044; G06F 2203/04101
See application file for complete search history.

(56) References Cited

U.S. PATENT DOCUMENTS

| | | | |
|---|---|---|---|
| 10,198,124 B2 | 2/2019 | Lee et al. | |
| 10,732,735 B2 | 8/2020 | Hara et al. | |
| 11,231,768 B1 * | 1/2022 | Cheng | G06F 1/3262 |
| 2013/0147735 A1 * | 6/2013 | Kim | G06F 3/041 345/173 |
| 2016/0098141 A1 * | 4/2016 | Kang | G06F 1/3265 345/174 |
| 2016/0188142 A1 * | 6/2016 | Oh | G06F 1/3265 345/87 |
| 2016/0209940 A1 | 7/2016 | Geller et al. | |
| 2017/0003824 A1 * | 1/2017 | Yun | G06F 3/041661 |
| 2021/0141471 A1 * | 5/2021 | Lee | G06F 3/04166 |
| 2021/0365156 A1 * | 11/2021 | Choi | G06F 3/0412 |
| 2022/0181394 A1 * | 6/2022 | Moon | H10K 59/131 |

* cited by examiner

*Primary Examiner* — Hong Zhou
(74) *Attorney, Agent, or Firm* — POLSINELLI PC

(57) ABSTRACT

An embodiment provides a touch circuit including a touch driving circuit supplying touch driving signals to touch electrodes, a touch sensing circuit sensing capacitance changes of the touch electrodes through touch sensing lines, and multiplexers, connected with the touch sensing lines, each transferring a capacitance change of a touch electrode to the touch sensing circuit. Some of the touch electrodes of the touch circuit are selectively short-circuited depending on a driving mode of the touch circuit and the touch electrodes are electrically connected with each other through the connection of nodes of the touch electrodes.

18 Claims, 14 Drawing Sheets

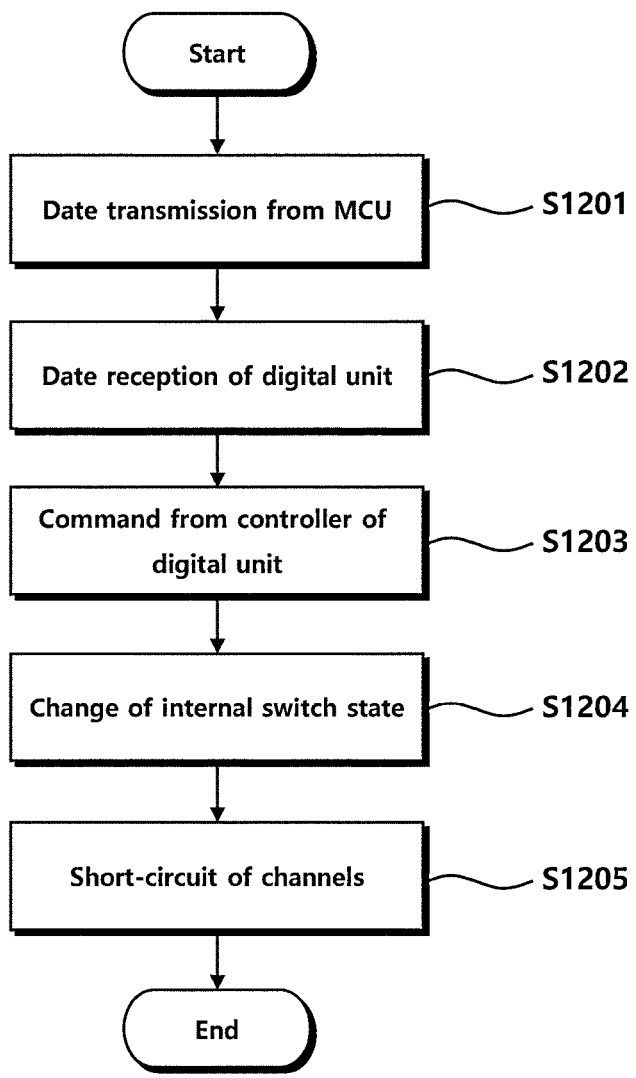

TOUCH CIRCUIT AND METHOD FOR CONTROLLING TOUCH CIRCUIT

CROSS REFERENCE TO RELATED APPLICATION

This application claims priority from Republic of Korea Patent Application No. 10-2021-0102612 filed on Aug. 4, 2021, which is hereby incorporated by reference in its entirety.

BACKGROUND

1. Field of Technology

The present embodiment relates to a touch integrated circuit and a display device including the same, and more particularly, to a touch circuit and a driving method thereof, which transfer a touch driving signal to a touch electrode and sense a capacitance change of the touch electrode.

2. Description of the Prior Art

A technology to recognize an external object that approaches or touches a touch panel is called a touch sensing technology. The touch panel is put on the same position as a display panel on a plane, and thus users can input a user operation signal onto the touch panel while viewing an image of the display panel. A method for generating such a user operation signal provides an amazing user intuition as compared with other previous user operation signal input methods, for example, mouse input method or keyboard input method.

According to such advantages, the touch sensing technology has been applied to various electronic devices including display panels. A touch circuit may sense a touch or proximity of an external object against the touch panel by supplying a driving signal to a driving electrode disposed on the touch panel and receiving a reaction signal being formed on a sensing electrode. The touch panel makes capacitance between the driving electrode and the sensing electrode, and a change of the capacitance may represent the touch or proximity of the external object.

Meanwhile, in order to sense the touch or proximity of the external object with respect to all areas of the touch panel, a continuous driving signal should be supplied to all driving electrodes, and this may cause a problem in that continuous power consumption occurs on the touch panel even if the touch or proximity of the object is not sensed.

SUMMARY OF THE INVENTION

Under such a background, an aspect of the present disclosure is to provide a touch circuit and a display device including the same, which can reduce a power being consumed in a touch panel by changing a pattern of a driving signal being supplied to a driving electrode in accordance with a driving mode of the touch panel.

Another aspect of the present disclosure is to provide a touch circuit and a display device including the same, which can optimize a performance load of a system by preventing an unnecessary system driving in a section in which a touch sensing technology is not used and selectively controlling an internal operation of a touch panel.

In one aspect, an embodiment may provide a touch circuit which includes a touch driving circuit supplying touch driving signals to touch electrodes; a touch sensing circuit sensing capacitance changes of the touch electrodes through touch sensing lines; and multiplexers, respectively connected to the touch sensing lines, each transferring a capacitance change of a touch electrode to the touch sensing circuit, wherein some of the touch electrodes are selectively short-circuited depending on a driving mode of a touch circuit and the touch electrodes are electrically connected to one with another through the connection of nodes of the touch electrodes.

In another aspect, an embodiment may provide a touch circuit which includes a touch driving circuit transferring touch driving signals to a first touch electrode and a second touch electrode through touch driving lines; and a touch sensing circuit receiving a touch signal transferred from the first touch electrode and the second touch electrode, wherein a switch is disposed between the first touch electrode and the second touch electrode, and the switch selectively short-circuits either the first touch electrode or the second touch electrode depending on a driving mode of a touch circuit.

In still another aspect, an embodiment may provide a method for controlling a touch circuit, which includes generating a control signal for switches disposed between a plurality of touch electrodes; transferring the control signal for switches to a readout circuit through a serial peripheral interface (SPI) communication method; and the readout circuit's selectively short-circuiting between the plurality of touch electrodes in response to the control signal for switches.

As is apparent from the above, according to the embodiment, since it is possible to determine a touch or not by using only one multiplexer through a short-circuit between touch electrodes depending on a driving mode of a touch panel, usage of a power consumed in the touch panel can be reduced.

According to the embodiment, since it is possible to simplify an internal operation sequence of a touch panel, data throughput and data processing speed can be reduced, and loads occurring in a data processing process can be reduced.

According to the embodiment, continuous touch sensing of a touch panel can be prevented through adaptation of a touch sensing method in response to a driving mode of the touch panel and touch panel driving can be optimized through reduction of unnecessary signal output.

BRIEF DESCRIPTION OF THE DRAWINGS

FIG. 14 is a diagram explaining a short-circuiting process between channels between touch electrodes of a touch circuit according to an embodiment.

DETAILED DESCRIPTION OF THE EXEMPLARY EMBODIMENTS

Figure 1:
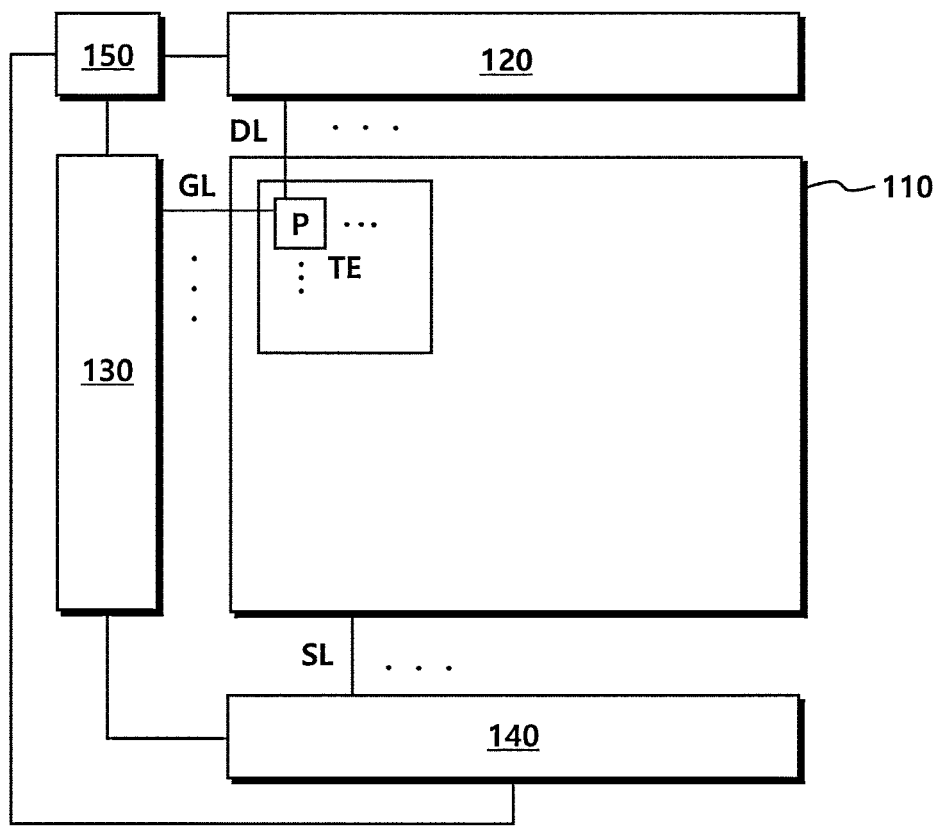
FIG. 1 is a configuration diagram of a general display device.

FIG. 1 is a configuration diagram of a general display device.

Referring to FIG. 1, a display device 100 may include a panel 110, a data driving circuit 120, a gate driving circuit 130, a touch circuit 140, and a control circuit 150.

On the panel 110, a plurality of data lines DL connected to the data driving circuit 120 may be formed, and a plurality of gate lines GL connected to the gate driving circuit 130 may be formed. Further, on the panel 110, a plurality of pixels P corresponding to crossing points of the plurality of data lines DL and the plurality of gate lines GL may be defined.

On each pixel P, a transistor may be formed in a manner that a first electrode (e.g., source electrode or drain electrode) is connected to the data line DL, a gate electrode is connected to the gate line GL, and a second electrode (e.g., drain electrode or source electrode) is connected to a display electrode.

Further, on the panel 110, a plurality of touch electrodes TE may be further formed to be spaced apart from one another. In an area where the touch electrode TE is located, one pixel P may be located, or plural pixels P may be located.

The panel 110 may include a display panel and a touch panel (touch screen panel (TSP)), and the display panel and the touch panel may share some constituent elements. For example, the plurality of touch electrodes TE may be one configuration (e.g., common electrode for applying a common voltage) of the display panel, and may be one configuration (touch electrode for sensing a touch) of the touch panel at the same time. As a type in which some constituent elements of the display panel and the touch panel are shared, an in-cell type panel has been known, but this is merely an example of the above-described panel 110, and the panel to which the present disclosure is applied is not limited to such an in-cell type panel.

The data driving circuit 120 supplies a data signal to the data line DL in order to display an image on each pixel P of the panel 110. The data driving circuit 120 may include at least one data driver integrated circuit, but is not limited thereto, and may be implemented in various ways.

The gate driving circuit 130 sequentially supplies a scan signal to the gate line GL to turn on/off a transistor located on each pixel P. The gate driving circuit 130 may include at least one gate driver integrated circuit, but is not limited thereto, and may be implemented in various ways.

The touch circuit 140 applies a driving signal to all or parts of the plurality of touch electrodes TE connected to a sensing line SL. The touch circuit 140 may be defined as a touch/data driving circuit (touch and driver driving IC (TDDI)) or a touch/display driving circuit (touch and display driving IC (TDDI)). The touch circuit 140 may include a source readout circuit (source readout driving IC (SRIC)) and a microprocessor (microprocessor unit (MCU)), and may perform a touch sensing from the touch electrode TE.

Since the touch/display driving circuit (TDDI) can drive one electrode in a time division manner in accordance with a display driving period and a touch driving period, the circuit size can be reduced. The electrode being used in the touch/data driving circuit may be defined as a common electrode or a touch electrode.

In case that the data driving circuit 120 and the touch circuit 140 forms the integrated touch/data driving circuit (TDDI), image data may be acquired by making a common electrode to which a common voltage is applied for a display driving period for image display into several blocks, and touch data may be acquired by utilizing several blocks of common electrodes as plural touch electrodes TE.

In order for the touch circuit 140 to apply the driving signal to all or parts of the plurality of touch electrodes TE, the sensing line SL connected to each of the plurality of touch electrodes TE may be necessary. Accordingly, the sensing line SL connected to each of the plurality of touch electrodes TE to transfer the touch driving signal may be formed in the first direction (e.g., vertical direction) or the second direction (e.g., horizontal direction) on the panel 110.

Meanwhile, the display device 100 may adopt a capacitive touch method recognizing a proximity or touch of an object by sending the capacitance change through the touch electrode TE. The capacitive touch method may be a mutual capacitance touch method or s self-capacitance touch method.

The mutual capacitance touch method that is a kind of capacitive touch method applies the driving signal to one touch electrode (Tx electrode), and senses another touch electrode (Rx electrode) mutually coupled to the Tx electrode. In the mutual capacitance touch method, the sensing value on the Rx electrode differs depending on the proximity or touch of an object, such as a finger or a pen, and the mutual capacitance touch method detects the touch or not or touch coordinate by using the sensing value on the Rx electrode.

In the self-capacitance touch method that is another kind of capacitive touch method, there is no distinction between the Tx electrode and the Rx electrode, and after the driving signal is applied to one touch electrode TE, the corresponding one touch electrode TE is sensed again.

The control circuit 150 may supply various kinds of control signals to the data driving circuit 120, the gate driving circuit 130, and the touch circuit 140. The control circuit 150 may transmit a data control signal (DCS) for controlling the data driving circuit 120 to supply a data voltage to each pixel P to match the timing, may transmit a gate control signal (GCS) to the gate driving circuit 130, or may transmit a sensing signal to the touch circuit 140.

The control circuit 150 may include a timing controller to further perform other control functions.

Figure 2:
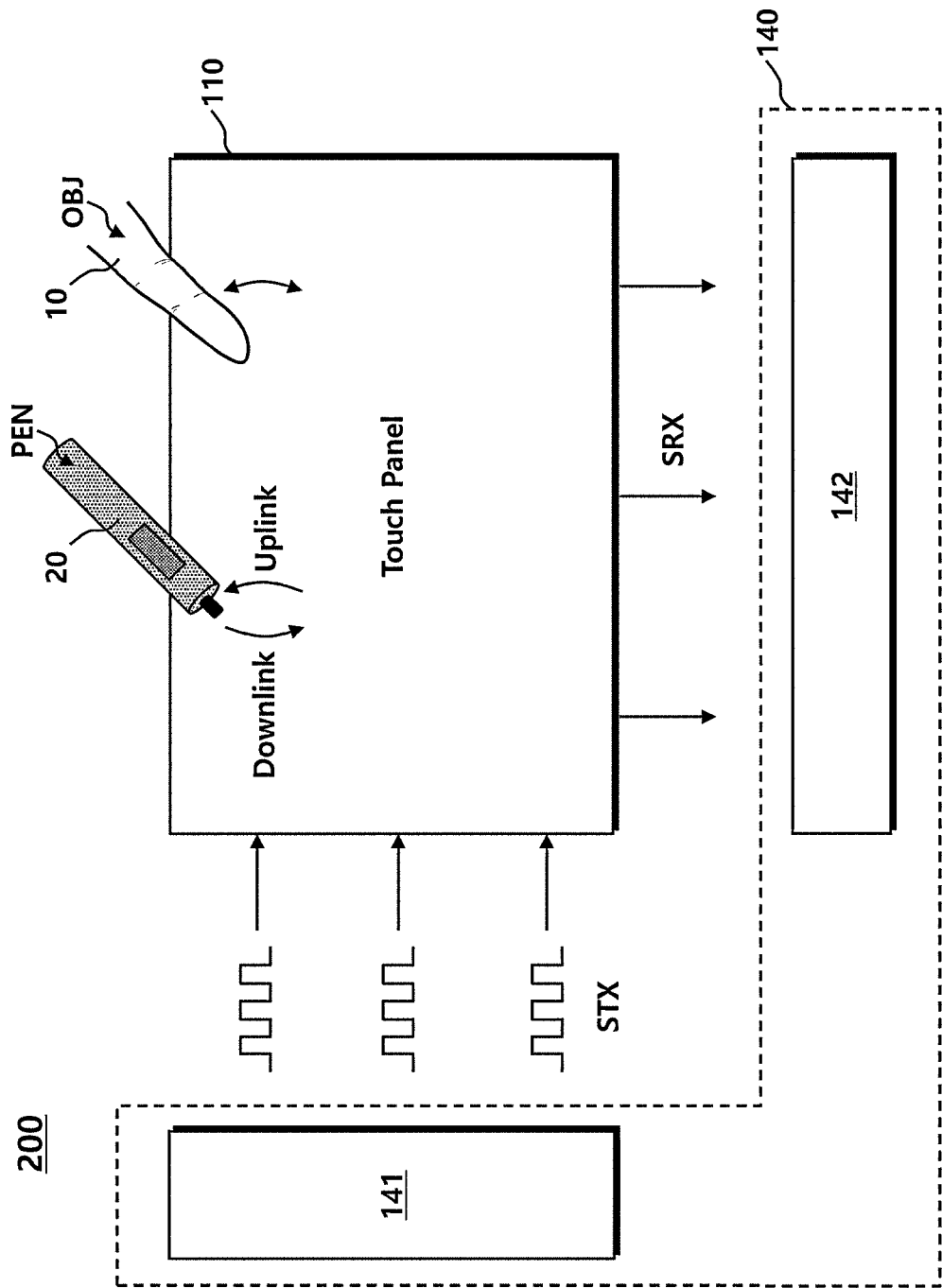
FIG. 2 is a diagram explaining a touch sensing process of a stylus pen and a finger according to an embodiment.

FIG. 2 is a diagram explaining a touch sensing process of a stylus pen and a finger according to an embodiment.

Referring to FIG. 2, in a touch sensing system 200, a display device 100, a touch panel 110, or a touch circuit 140 may transmit an uplink (UL) signal with an object, for example, a stylus pen or a finger.

The touch circuit 140 may include a touch driving circuit 141 transferring a touch driving signal (STX) to the touch electrode, and a touch sensing circuit 142 receiving a touch sensing signal SRX for a capacitance change on the touch electrode, and if needed, all or some configurations of the touch circuit 140 may be defined as a readout circuit (readout integrated circuit (ROIC)).

The touch driving circuit 141 of the touch circuit 140 may transmit the uplink (UL) signal to the stylus pen 20 through the touch electrode. If the stylus pen 20 touches the panel 110 including the touch electrode or approaches within a predetermined distance, the stylus pen 20 may receive the uplink (UL) signal. The uplink (UL) signal may be transmitted from a part or the whole of the touch panel 110 to the stylus pen 20.

The uplink (UL) signal transferred from the touch circuit 140 to the stylus pen 20 may include information about the touch panel (e.g., status information of the touch panel, identification information of the touch panel, and type information of the touch panel), information about the driving mode of the touch panel (e.g., identification information of a stylus pen search mode or a stylus pen driving mode), and characteristic information of a stylus pen signal (e.g., driving frequency of the touch panel, transmission frequency of the stylus pen, and the number of pulses of a signal).

The touch sensing circuit 142 of the touch circuit 140 may receive a downlink (DL) signal from the stylus pen 20 through the touch electrode. If the stylus pen 20 receives the uplink (UL) signal, it may transmit the downlink (DL) signal. The downlink (DL) signal may be transmitted to the touch electrode located at a point that is touched or approached by the stylus pen.

If the downlink (DL) signal enters the touch circuit 140, the touch circuit 140 may continuously send and receive data to and from the stylus pen 20. If the downlink (DL) signal does not enter the touch circuit 140 from a certain time point, the touch sensing device may search an active pen again. That is, the touch circuit 140 may repeat the above-described process by sending the uplink (UL) signal to the stylus pen again.

The touch circuit 140 may determine the touch or not, touch position, touch strength, and touch interval depending on the capacitance change of the touch electrode in accordance with the touch or proximity of the object (OBJ) 10.

Further, the touch circuit 140 may receive the downlink (DL) signal generated by the stylus pen 20 by itself regardless of the information in accordance with the touch or proximity of the object.

The downlink (DL) signal may include information about the state of the stylus pen (exemplarily, the state of the stylus pen may include power information of the stylus pen, frequency information of the stylus pen, protocol information of the stylus pen, moving speed of the stylus pen, location, and slope information).

The downlink (DL) signal being transmitted by the stylus pen 20 may adopt a different frequency from the frequency of the driving signal, and a processor (not illustrated) or a frequency selecting circuit (not illustrated) inside the stylus pen 20 may adopt the frequency in consideration of the information about the state of the stylus pen 20.

The touch circuit 140 may distinguish the signal being generated by the capacitance change of the touch electrode due to the object approaching the panel and the signal being generated by the downlink signal transmitted by the object approaching the panel from each other.

The touch circuit 140 of FIG. 2 exemplifies the mutual capacitance type touch sensing, but the technical idea of the present disclosure is not limited thereto, and may also be applied to the self-capacitance type touch sensing.

Figure 3:
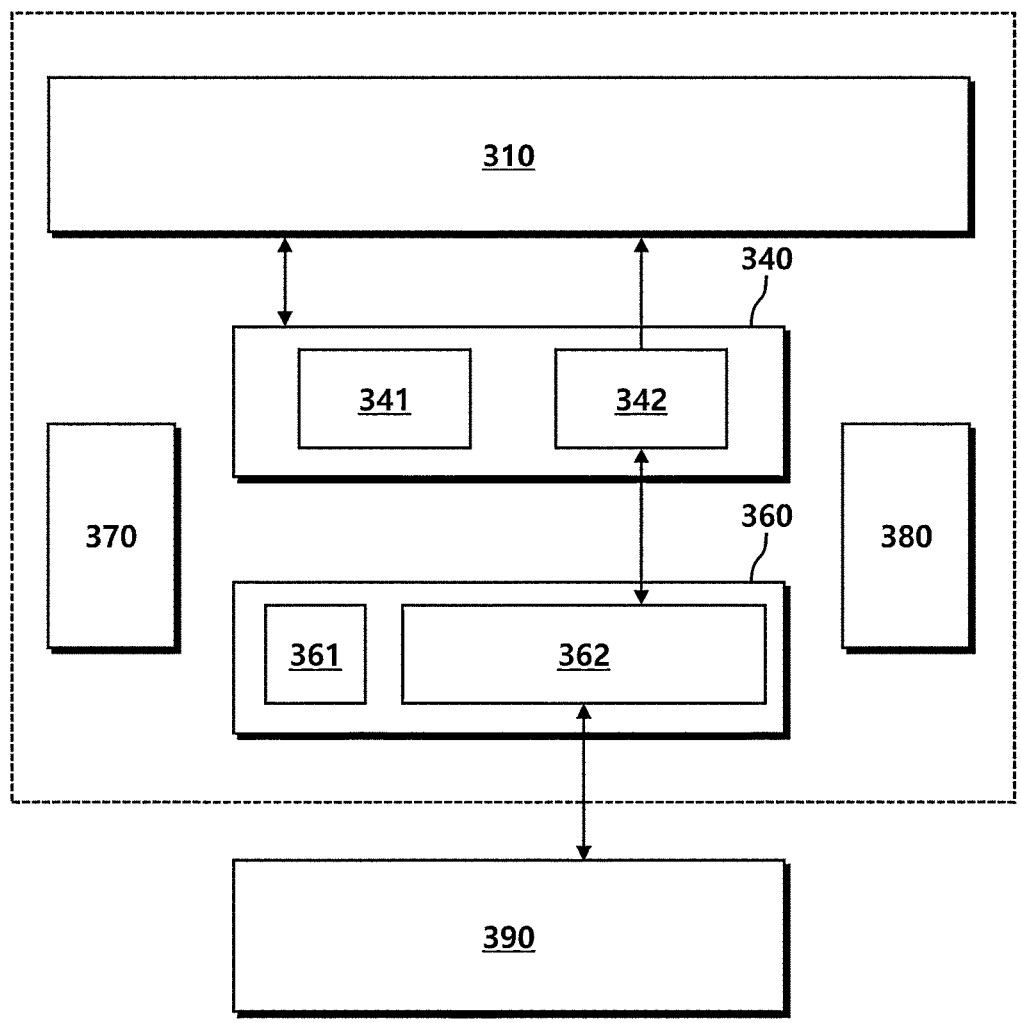
FIG. 3 is a diagram explaining a communication method of a touch circuit according to an embodiment.

FIG. 3 is a diagram explaining a communication method of a touch circuit according to an embodiment.

Referring to FIG. 3, a display device 300 may include a panel 310, a source readout circuit 340, a microprocessor 360, a power circuit 370, and a backlight circuit 380.

The panel 310 may be the above-described panel of FIG. 1, or may be implemented in the form in which the display panel or the touch panel (touch screen panel (TSP)) are separated or integrated.

The source readout circuit (source readout integrated circuit (SRIC)) 340 may include an analog unit 341 and a digital unit 342.

The analog unit 341 may be a circuit transmitting and receiving an analog signal, for example, touch driving signal or touch sensing signal, to and from the panel 310, and may receive the analog signal, convert the analog signal into a digital signal, and transfer the digital signal to the digital unit 342.

The digital unit 342 may receive the digital signal converted by the analog unit 341, or may convert the digital signal into an analog signal to transfer the analog signal to the analog unit 341. Further, the digital unit 342 may transmit and receive the digital signal, for example, panel control signal or switch control signal, to and from the microprocessor 360. For example, the communication between the digital unit 342 and the microprocessor 360 may be the serial peripheral interface (SPI) type communication.

The microprocessor 360 may include a touch arithmetic algorithm circuit 361 and a communication protocol circuit 362.

The touch arithmetic algorithm circuit 361 may compute the touch coordinate and touch strength based on the touch information transferred from the digital unit 342, and such computation may be performed through an algorithm set therein or an algorithm transferred from the outside.

The communication protocol circuit 362 may be a circuit which generates or controls a universal serial bus (USB) communication protocol, a pen communication protocol, or a serial peripheral interface (SPI) communication protocol with a host 390.

The communication protocol circuit 362 may send and receive data to and from the digital unit 342 of the touch circuit 340 through the SPI communication, or may transmit and receive a signal for controlling the digital unit 342.

The pen communication protocol may be a communication protocol for transmitting the uplink signal from the touch panel to the pen and receiving the downlink signal from the pen.

The power circuit 370 may be a circuit that supplies a power to the touch circuit 340, the microprocessor 360, and the like. The power circuit 370 may reduce power consumption being consumed in the respective circuits by differently adjusting the current or voltage being supplied corresponding to the operation of the touch circuit 340 or the microprocessor 360.

The backlight circuit 380 may be a circuit that controls an operation of a light emitting diode (LED) being used in case that the panel 310 is a liquid crystal display (LCD), and may be selectively included depending on the kind of the panel 310.

The host 390 may be an external device, such as a notebook computer, a monitor, or a tablet.

Figure 4:
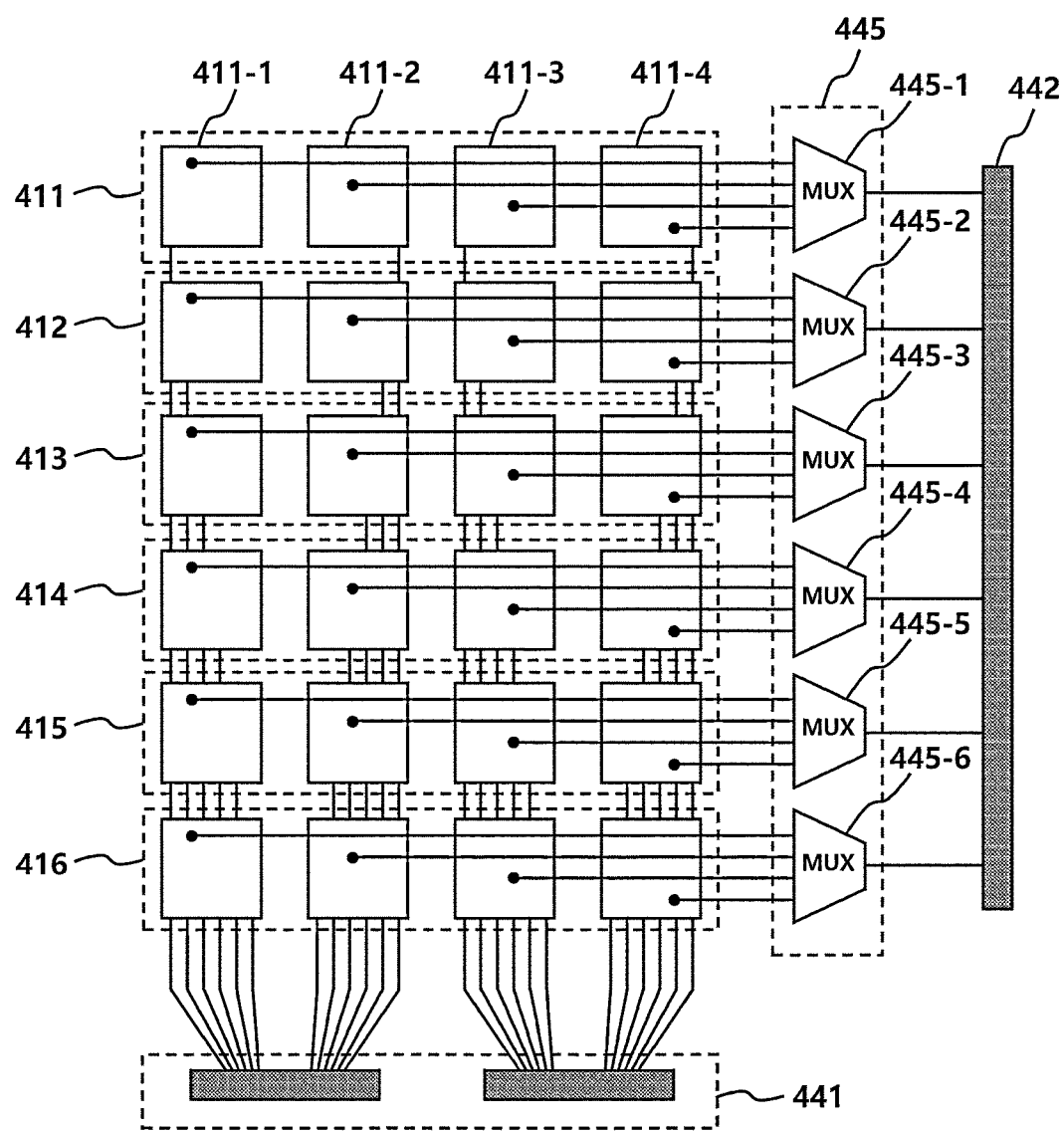
FIG. 4 is a first exemplary diagram explaining an operation of a touch circuit according to an embodiment.

FIG. 4 is a first exemplary diagram explaining an operation of a touch circuit according to an embodiment.

Figure 5:
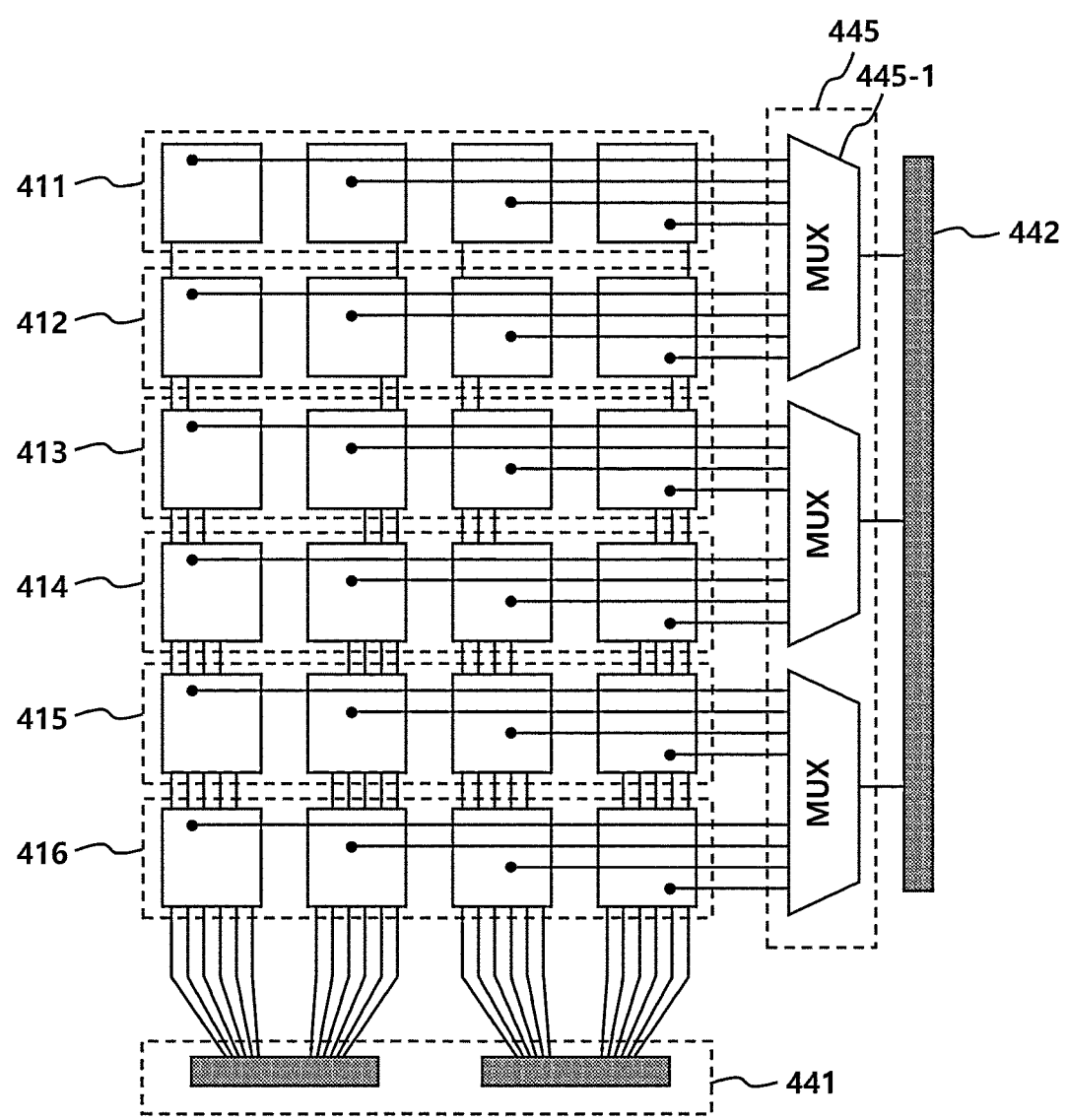
FIG. 5 is a second exemplary diagram explaining an operation of a touch circuit according to an embodiment.

FIG. 5 is a second exemplary diagram explaining an operation of a touch circuit according to an embodiment.

Referring to FIGS. 4 and 5, a touch circuit may transfer a touch driving signal transferred from a touch driving circuit 441 to a touch electrode, and a touch sensing circuit 442 may receive a touch sensing signal about a capacitance change of the touch electrode through one or more multiplexers 445.

The touch driving circuit 441 may transfer the touch driving signal to the touch electrode through a plurality of a plurality of sensing lines SL connected to the touch driving circuit 441, and the touch sensing circuit 442 may receive the touch sensing signal transferred from the touch electrode through the plurality of sensing lines SL connected to a touch sensing circuit 442 that is discriminated from the above-described touch sensing circuit 442.

One or more multiplexers 445 may be further disposed between the touch electrode and the touch sensing circuit 442.

The multiplexer 445 may select one of the signals being transferred from the plurality of sensing lines SL about the capacitance change being generated on the touch electrode, and may transfer the selected signal to the touch sensing circuit 442. The N (N is a natural number equal to or larger than 1) sensing lines may be connected to the N (N is a natural number equal to or larger than 1) touch electrodes, and the touch sensing signals generated from the respective touch electrodes may be transferred to the touch sensing circuit 442 through the multiplexer 445.

The multiplexer 445 may form a multiplexer group composed of a plurality of multiplexers, and one end part of each multiplexer may be connected to the touch electrode through the sensing line.

For example, as shown in FIG. 4, a first multiplexer 445-1 may be connected to nodes formed on first to fourth touch electrodes 411-1, 411-2, 411-3, and 411-4 through four signal lines for the first to fourth touch electrodes 411-1, 411-2, 411-3, and 411-4. In this case, the first to fourth touch electrodes 411-1, 411-2, 411-3, and 411-4 may be defined as a first touch group 411, and the first multiplexer 445-1 may be defined to be connected to the first touch group 411. Second to sixth multiplexers (not illustrated) may also be connected to second to sixth touch groups 412, 413, 414, 415, and 416, respectively.

For example, as shown in FIG. 5, the first multiplexer 445-1 may be connected to nodes formed on the first to eighth touch electrodes (not illustrated) through eight signal lines for the first to eighth touch electrodes (not illustrated). In this case, the first to fourth touch electrodes may be defined as the first touch group 411, and the fifth to eighth touch electrodes may be defined as the second touch group 412. The first multiplexer 445-1 may be defined to be connected to the first touch group 411 and the second touch group 412.

As shown in FIGS. 4 and 5, in case that the touch driving circuit 441 supplies the touch driving signal to all touch electrodes, and senses the capacitance change of the respective touch electrodes, the all touch electrodes sense the capacitance change in real time, and thus the power consumption being consumed in the touch panel driving process is increased. Further, in case that all multiplexers 445-1, 445-2, 445-3, 445-4, 445-5, and 445-6 corresponding to the respective touch electrodes or the respective touch electrode groups operate, the power consumption being consumed in the touch panel driving process is increased.

Figure 6:
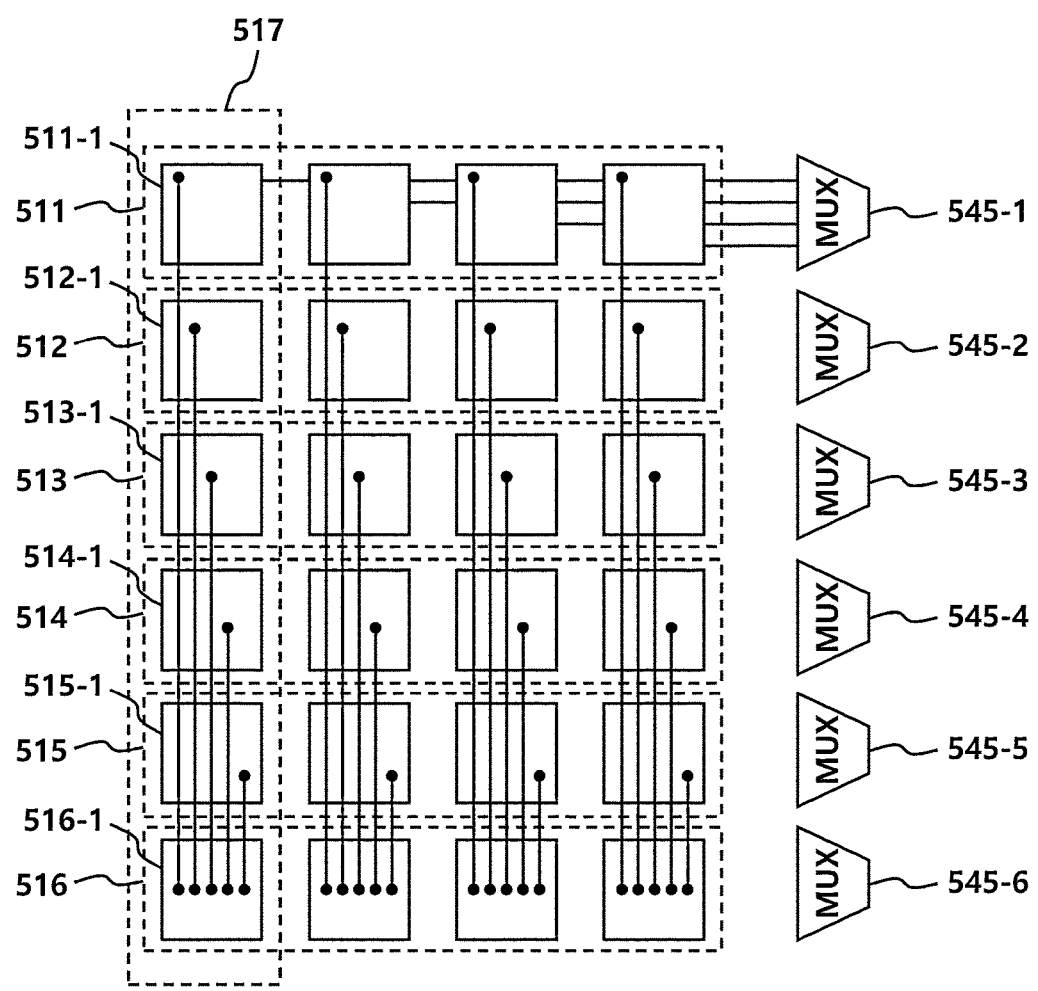
FIG. 6 is a third exemplary diagram explaining an operation of a touch circuit according to an embodiment.

FIG. 6 is a third exemplary diagram explaining an operation of a touch circuit according to an embodiment.

Referring to FIG. 6, a first touch group 511 may be short-circuited to other touch groups 512, 513, 514, 515, and 516, and may identify the connected state.

The short-circuited state of the touch electrodes may be explained through a connection relationship of some electrodes, for example, a first touch electrode 511-1, a second touch electrode 512-1, a third touch electrode 513-1, a fourth touch electrode 514-1, a fifth touch electrode 515-1, and a sixth touch electrode 516-1.

The touch group may be defined as a group of certain touch electrodes connected to a multiplexer, and is not limited to a method illustrated in FIG. 6. The first touch group 511 may be a group of the touch electrodes connected by signal lines connected to the first multiplexer 545-1, and the second to sixth touch groups 512 to 516 may also be defined in the same manner.

The sixth touch electrode 516-1 of the sixth touch group 516 may be electrically connected to the first touch electrode 511-1 of the first touch group 511, the second touch electrode 512-1 of the second touch group 512, the third touch electrode 513-1 of the third touch group 513, the fourth touch electrode 514-1 of the fourth touch group 514, and the fifth touch electrode 515-1 of the fifth touch group 515. All or some of the respective touch electrodes may be selectively short-circuited through the signal lines between the nodes, and may be electrically connected to each other.

In this case, the first to sixth touch electrodes 511-1 to 516-1 may be short-circuited to form one touch group 517, and may sense only simplified information, such as the touch or not without sensing all pieces of position information of the touch panel. For example, since the second touch electrode 512-1 is short-circuited to the sixth touch electrode 516-1, the touch sensing signal being generated by an object that approaches the second touch electrode 512-1 may be transferred to the sixth touch electrode 516-1. Further, since the sixth touch electrode 516-1 is short-circuited to the first touch electrode 511-1, the signal transferred to the sixth touch electrode 516-1 may be transferred to the first touch electrode 511-1. The first touch electrode 511-1 may transfer the touch sensing signal to the multiplexer through the sensing line SL connected to the multiplexer. In case that the plurality of touch electrodes are electrically connected as described above, the touch sensing signals may be sequentially transferred to a specific touch electrode through the signal line, and may transfer the touch sensing signal in a desired direction or position.

The touch electrodes 511-1 to 516-1 existing in the touch group 517 may be handled as one touch electrode virtually formed, and may be selectively short-circuited depending on the driving mode of the touch panel or the set value of the touch circuit.

In case of collecting touch data through forming of the touch group 517, only the touch data in the touch group 517 can be selectively collected, integrated, and managed, the throughput of the collected data can be reduced. Further, in case that the driving mode of the touch circuit is a low power mode, only information for determining only wakeup or not of the system is necessary, and such a circuit structure may be utilized in case that the driving mode of the touch circuit is the low power mode.

The data collected by the touch group 517 may be transferred to the first multiplexer 545-1 through one sensing line SL.

In the same method as above, all touch sensing signals about the capacitance change on the second to sixth touch electrodes 512-1 to 516-1 may be transferred to the first touch electrode 511-1. The touch sensing signals transferred to the first touch electrode 511-1 may be transferred to the first multiplexer 545-1, and may be transferred to a touch sensing circuit (not illustrated).

In this case, the second to sixth multiplexers 545-2 to 545-6 may be electrically disconnected from the touch electrode. Exemplarily, the second to sixth multiplexers 545-2 to 545-6 may be maintained in an open state without being connected to the sensing line SL by the switch (not illustrated). In case that the first multiplexer 545-1 is selected as a reference multiplexer without changing the structure of the touch panel, and the remaining multiplexers 545-2 to 545-6 are open, only one multiplexer is used, and thus efficiency of internal power usage can be improved. In case of controlling all multiplexers, since the computation amount of an internal processor is increased and the computational difficulty is increased, some multiplexers may be put in an off state to simplify the touch sensing operation.

The touch group may be open or short-circuited by the opening/closing of the internal switch (not illustrated), and the operation of the switch (not illustrated) may be selectively open or short-circuited corresponding to the driving mode of the touch circuit.

In case that the internal operation becomes different depending on whether the driving mode of the touch circuit is a normal mode or a low power mode, the above-described operation of FIG. 4 may be defined as an operation in the normal mode, and the operation of FIG. 6 may be defined as an operation in the low power mode.

Figure 7:
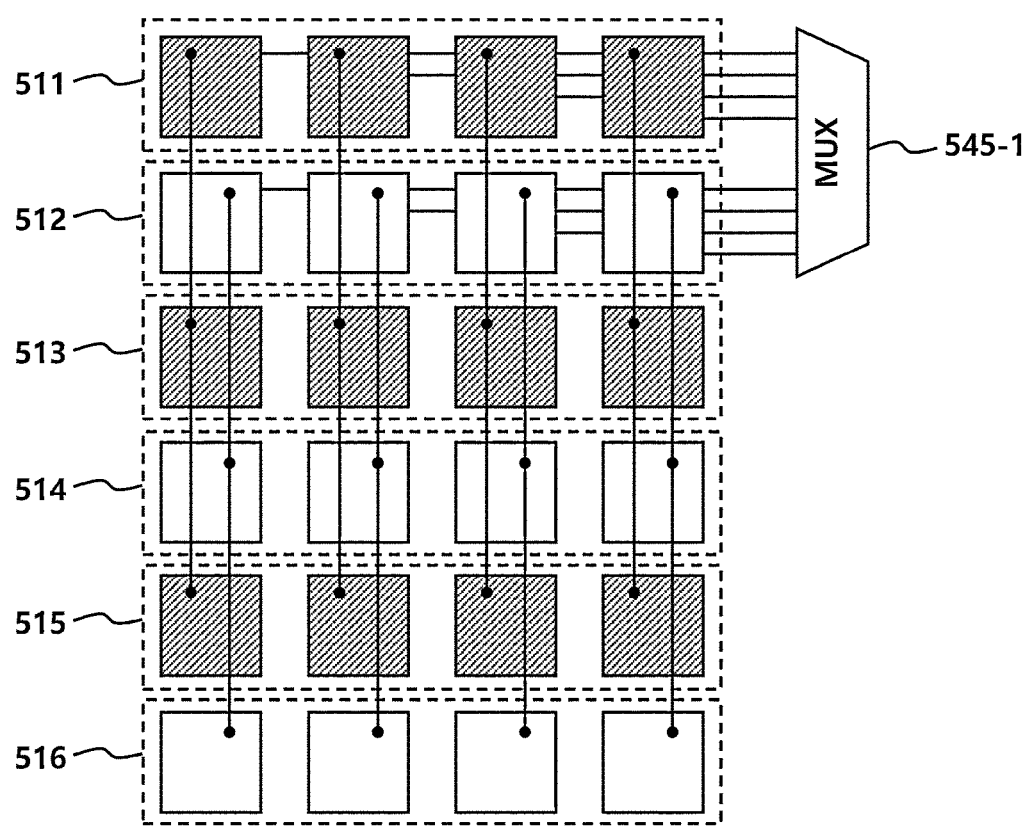
FIG. 7 is a fourth exemplary diagram explaining an operation of a touch circuit according to an embodiment.

FIG. 7 is a fourth exemplary diagram explaining an operation of a touch circuit according to an embodiment.

Referring to FIG. 7, one multiplexer may be connected to the sensing line SL so as to receive the touch sensing signal in the first touch group 511 and the second touch group 512.

As shown in FIG. 7, in case that one multiplexer is connected to the plurality of touch groups, the number of multiplexers can be reduced, and thus the size of the touch panel can be reduced. Exemplarily, two channels, for example, first touch group 511 and the second touch group 512, may be structured to be connected to one multiplexer.

The first touch group 511 may be electrically connected to the third touch group 513, and the third touch group 513 may be electrically connected to the fifth touch group 515. By generalizing the connection relationship of the respective touch groups, one integrated touch group may be formed.

In the same manner, the second touch group 512 may be electrically connected to the fourth touch group 514, and the fourth touch group 514 may be electrically connected to the sixth touch group 516.

Since it can reduce the power usage to operate the internal switch (not illustrated) for the short-circuiting of some touch groups rather than to operate the internal switch (not illustrated) for the short-circuiting of all touch groups, one or more integrated touch groups may be formed by optionally defining the short-circuit areas as shown in FIG. 7. The technical idea of the present disclosure is not limited to that illustrated in FIG. 7.

The first touch group 511, the third touch group 513, or the fifth touch group 515 may be defined as an odd-numbered touch group in which odd-numbered channels are integrated. In this case, the touch sensing signals generated by the first touch group 511, the third touch group 513, and the fifth touch group 515 may be transferred to the multiplexer 545-1 through the touch electrodes of the first touch group 511.

The touch group may be open or short-circuited by the opening/closing of the internal switch (not illustrated), and the operation of the switch (not illustrated) may be selectively open or short-circuited corresponding to the driving mode of the touch circuit.

The above-described touch groups may be defined to form one channel. Further, the above-described operation may be defined as the short-circuit state between the plurality of channels.

In case that the internal operation differs depending on whether the driving mode of the touch circuit is the normal mode or the low power mode, the above-described operation of FIG. 5 may be defined as the operation in the normal mode, and the operation of FIG. 7 may be defined as the operation in the low power mode.

Figure 8:
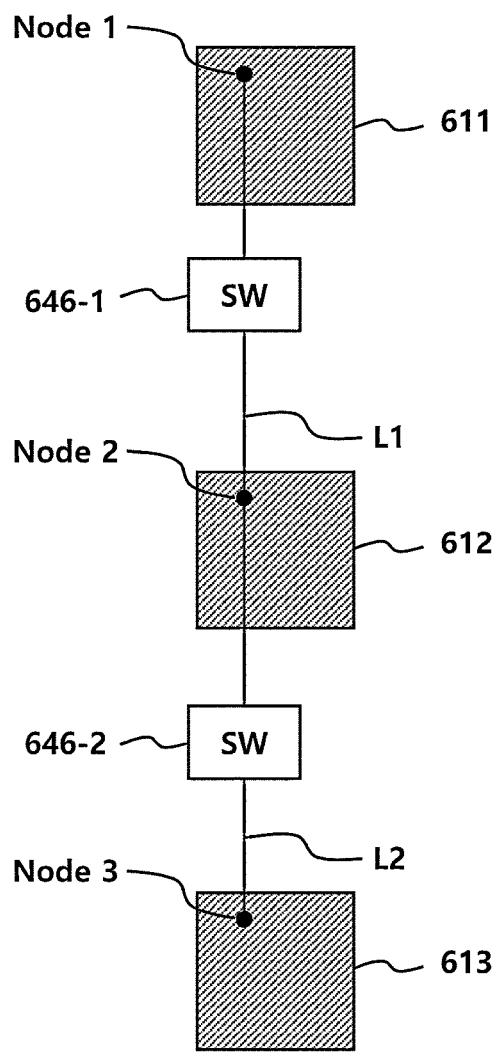
FIG. 8 is a diagram explaining an operation of a switch between touch electrodes according to an embodiment.

FIG. 8 is a diagram explaining an operation of a switch between touch electrodes according to an embodiment.

Referring to FIG. 8, switches 646-1 and 646-2 may be connected between a plurality of touch electrodes 611, 612, and 613.

The first node (Node 1) formed on the first touch electrode 611 may be electrically connected to the second node (Node 2) formed on the second touch electrode 612, and this may be a physical or virtual connection relationship.

The first switch 646-1 may be disposed between the first node and the second node, and may selectively short-circuit the first touch electrode 611 and the second touch electrode 612 corresponding to an external or internal control signal.

For example, the first signal line L1 formed between the first touch electrode 611 and the second touch electrode 612 may be open or short-circuited by the first switch 646-1.

In the same manner, the second node (Node 2) formed on the second touch electrode 612 and the third node (Node 3) formed on the third touch electrode 613 may be electrically connected to each other.

The second switch 646-2 may be disposed between the second node and the third node, and may selectively short-circuit the second touch electrode 612 and the third touch electrode 613 corresponding to the external or internal control signal.

For example, the second signal line L2 formed between the second touch electrode 612 and the third touch electrode 613 may be open or short-circuited by the second switch 646-2.

The first signal line L1 and the second signal line L2 may be one wire, or may be separated wires.

The first switch 646-1 and the second switch 646-2 may operate at the same time or at different times, and signals controlling the respective switches may be independently transferred.

The first switch 646-1 and the second switch 646-2 may be selectively short-circuited or open depending on the driving mode of the touch circuit, for example, the normal mode or the low power mode, to connect the nodes of the touch electrodes.

The operations of the first switch 646-1 and the second switch 646-2 may be defined and changed through reception of the control signal of the internal or external switch.

Further, the operations of the first switch 646-1 and the second switch 646-2 may be defined and changed corresponding to set values of internal registers of the readout circuit (not illustrated). This may be the change of the physical connection state of the internal integrated circuit, and operations for opening or short-circuiting the respective nodes may be performed in accordance with the change of the set value of the internal registers inside the integrated circuit.

The first switch 646-12 and the second switch 646-2 may be synchronized with a signal for controlling the operation of the multiplexer (not illustrated) connected to the sensing line SL, or may be synchronized with a control signal of the switch (not illustrated) for controlling the electrical connection relationship of the multiplexer (not illustrated).

The first switch 646-1 and the second switch 646-2 may be disposed between the touch electrodes, or may be disposed between the touch driving circuit and the touch sensing circuit.

The connection relationship between the touch electrodes and the switches as described above with reference to FIG. 8 is to explain the electrical connection relationship of the touch electrodes, and the technical idea of the present disclosure is not limited thereto, and the touch electrodes, the sensing lines, and the switches may have various connection relationships or disposition relationships.

Figure 9:
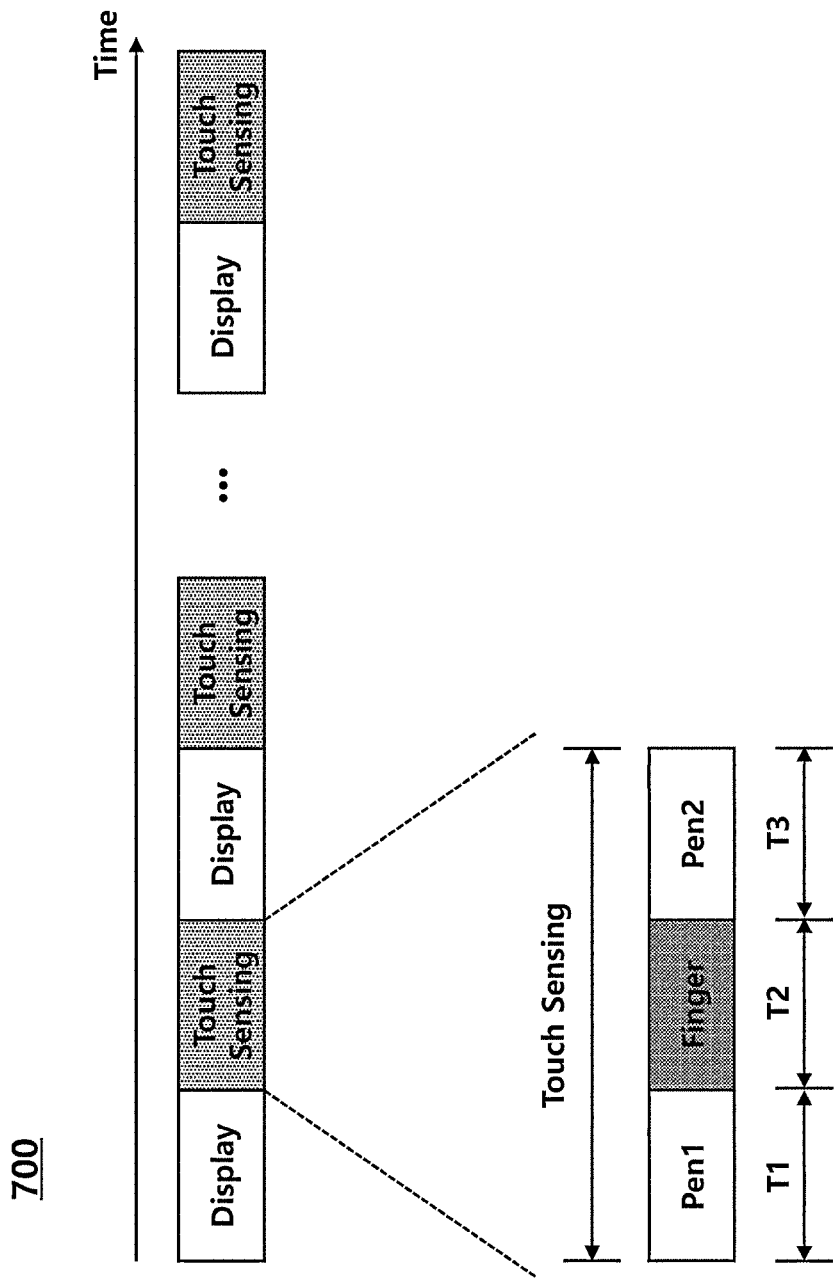
FIG. 9 is a diagram explaining time division driving of a touch circuit according to an embodiment.

FIG. 9 is a diagram explaining time division driving of a touch circuit according to an embodiment.

Referring to FIG. 9, according to a touch sensing method 700, the panel may be driven through division of the driving period of the display device 100 into a display driving period or a touch sensing period. If needed, the touch sensing period may be defined as a period in which the touch driving signal is transferred or the touch sensing signal is received.

The display driving period DP and the touch sensing period TP are periods divided in time, and may alternate with each other.

In case that a plurality of objects touch or approach, the touch sensing periods of the respective objects may be divided in time, and may be individually sensed.

Exemplarily, in the touch sensing period, the touch sensing period T1 of the first stylus pen, the touch sensing period T2 of the finger, and the touch sensing period T3 of the second stylus pen may be separated, and may be sequentially performed.

In order to separately sense the finger touch, the touch of the first stylus pen, and the touch of the second stylus pen, the frequency bands of the respective sensing signals may be defined as a first frequency, a second frequency, and a third frequency for sensing. For more accurate touch sensing, the first to third frequencies may be selected as different frequencies, but as needed, they may be selected as the same frequency.

Figure 10:
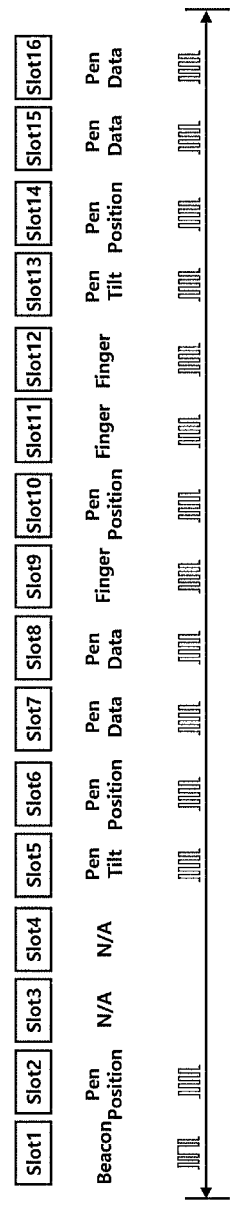
FIG. 10 is a diagram explaining a process in which a touch circuit drives in a normal mode according to an embodiment.

FIG. 10 is a diagram explaining a process in which a touch circuit drives in a normal mode according to an embodiment.

Referring to FIG. 10, if the driving mode of the touch circuit is the normal mode, a driving method 800 may have one or more slots.

The touch circuit may transfer the touch driving signal so as to have a plurality of slots for a time period defined as one frame, and may receive the touch sensing signal. Exemplarily, one frame may include 16 slots.

Exemplarily, if the driving mode of the touch circuit is the normal mode, the first slot may be a slot for transferring a beacon signal. The beacon signal may be a signal for identifying whether the object is recognized.

Exemplarily, if the driving mode of the touch circuit is the normal mode, the second slot, the sixth slot, the tenth slot, and the fourteenth slot may be slots for receiving position information of the pen.

Exemplarily, if the driving mode of the touch circuit is the normal mode, the third slot and the fourth slot may be slots which do not transmit or receive the signal. They may be defined as deactivated slots.

Exemplarily, if the driving mode of the touch circuit is the normal mode, the fifth slot and the thirteenth slot may be slots for receiving slope information of the pen.

Exemplarily, if the driving mode of the touch circuit is the normal mode, the seventh slot, the eighth slot, the fifteenth slot, and the sixteenth slot may be slots for receiving data transferred from the pen.

Exemplarily, if the driving mode of the touch circuit is the normal mode, the ninth slot, the eleventh slot, and the twelfth slot may be slots for sensing the finger touch.

Through the above-described combinations of one or more slots, a communication protocol for communication between the touch panel and the object may be defined.

The signal being transmitted or received by one slot may be the above-described signal of FIG. 1, and the pattern, the number, and the timing of the communication protocol for the touch may be defined different from those for the sensing.

Figure 11:
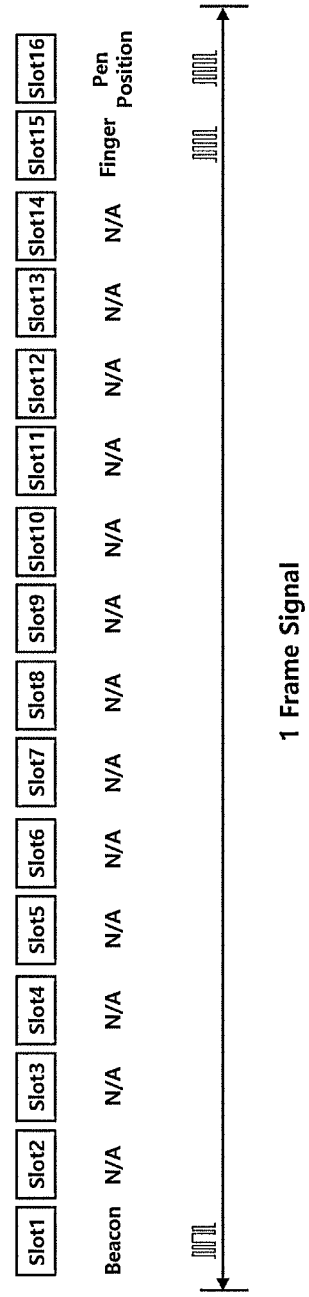
FIG. 11 is a diagram explaining a process in which a touch circuit drives in a low power mode according to an embodiment.

FIG. 11 is a diagram explaining a process in which a touch circuit drives in a low power mode according to an embodiment.

Referring to FIG. 11, if the driving mode of the touch circuit is the low power mode, a driving method 900 may have one or more slots.

Exemplarily, if the driving mode of the touch circuit is the low power mode, the first slot may be a slot for transferring a beacon signal.

Exemplarily, if the driving mode of the touch circuit is the low power mode, the second to fourteenth slots may be slots which do not transmit or receive the signal. They may be defined as deactivated slots.

Exemplarily, if the driving mode of the touch circuit is the low power mode, the fifteenth slot may be a slot for sensing the finger touch.

Exemplarily, if the driving mode of the touch circuit is the low power mode, the sixteenth slot may be a slot for receiving position information of the pen.

In case that the driving mode of the touch circuit is the low power mode, as compared with the case that the driving mode of the touch circuit is the normal mode, the operations of the respective slots of the protocol can be selectively omitted or changed for efficient system usage.

Exemplarily, if the driving mode of the touch circuit is the low power mode, only the slot for transferring the beacon signal, the slot for receiving the position information of the pen, and the slot for sensing the finger touch can be used. In this case, since the slot does not receive the slope information of the pen and data being transferred from the pen, the operation of the touch circuit can be simplified, and the power being consumed in the touch panel can be reduced.

Exemplarily, in case that the driving mode of the touch circuit is the low power mode, as compared with the case that the driving mode of the touch circuit is the normal mode, the number of deactivated slots can be increased, and the kinds of slots being used can be reduced.

In case that the driving mode of the touch circuit is changed to the normal mode, the power being consumed in the touch panel can be minimized by changing the kind, the number, and the pattern of the signals being transferred to the touch panel together with the internal operation change of the touch panel.

As shown in FIG. 11, by simplifying the protocol being used in the touch sensing process, it becomes possible to solve the problem of the energy efficiency reduction occurring in the continuous touch sensing process and the problem of the data processing overload of the microprocessor. Further, unnecessary system driving can be prevented in a section in which the object approach is not identified, for example, in the low power mode.

Unlike the operation described above with reference to FIG. 11, according to the technical idea of the present disclosure, the number and the order of slots in one frame can be variously changed.

Figure 12:
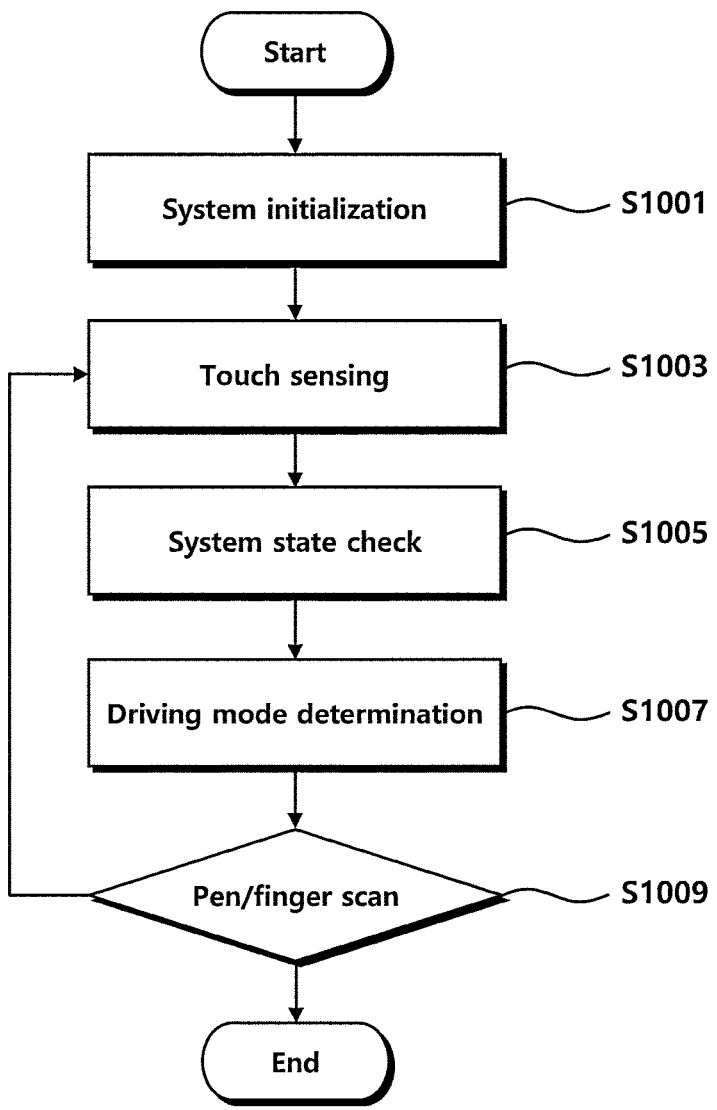
FIG. 12 is a diagram explaining a pen/finger scan process of a touch circuit according to an embodiment.

FIG. 12 is a diagram explaining a pen/finger scan process of a touch circuit according to an embodiment.

Referring to FIG. 12, a pen/finger scan method 1000 of the touch circuit may include steps of system initialization (S1001), touch sensing start (S1003), system state checking (S1005), determination of the driving mode of the touch circuit (S1007), and pen/finger scan (S1009).

The system initialization step (S1001) may be a step of initializing the state of an internal arithmetic device or a storage device.

The touch sensing start step (S1003) may be a step of transferring the touch driving signal in the above-described method, or receiving the touch sensing signal from the touch electrode. Further, communication between the object and the touch panel may be performed.

The system state checking step (S1005) may be a step of identifying whether the object approaches after the touch sensing start and the system state depending on the state of the object. In order to identify the system state, the system state may be continuously identified in a polling method.

The step of determining the driving mode of the touch circuit (S1007) may be a step of determining the driving mode of the touch circuit as the normal mode or the low power mode.

Exemplarily, if the system state is checked, and it is determined that the object does not approach the touch panel for a predetermined time, the driving mode of the touch circuit may be determined or changed to the low power mode. As another example, if the system state is checked, and it is determined that the object approaches the touch panel, the driving mode of the touch circuit may be determined or changed to the normal mode.

The condition that the driving mode is changed from the normal mode to the low power mode may be set to a case where the touch input does not exist in the system for a predetermined time, and the condition that the driving mode is changed from the low power mode to the normal mode may be set to a case where the touch input exists for a predetermined number of times or for a predetermined time.

The pen/finger scan step (S1009) may be a step of scanning whether the object, such as the pen or finger, approaches corresponding to the driving mode of the touch circuit. The above-described protocol of FIGS. 10 and 11 may be sued in the process of scanning whether object approaches.

If the driving mode of the touch circuit is the normal mode, the touch driving signal may be supplied to all the touch electrodes of the system, and the touch sensing signal may be received through some sensing lines connected to the touch electrodes and the multiplexer.

If the driving mode of the touch circuit is the low power mode, the touch driving signal may be supplied to all or some of the touch electrodes of the system, and the touch sensing signal may be received through some sensing lines connected to the touch electrodes and the multiplexer.

If the driving mode of the touch circuit is the low power mode, it may be determined whether the system wakes up, and if the object approaches, the driving mode of the touch circuit may be changed to the normal mode again.

Further, in the pen/finger scan step (S1009), the state information of the pen or the finger may be received, and the pen/finger scan may be temporarily stopped corresponding to the driving mode of the touch circuit, and on a predetermined condition, the operation may be changed again to the touch sensing start step (S1003).

Figure 13:
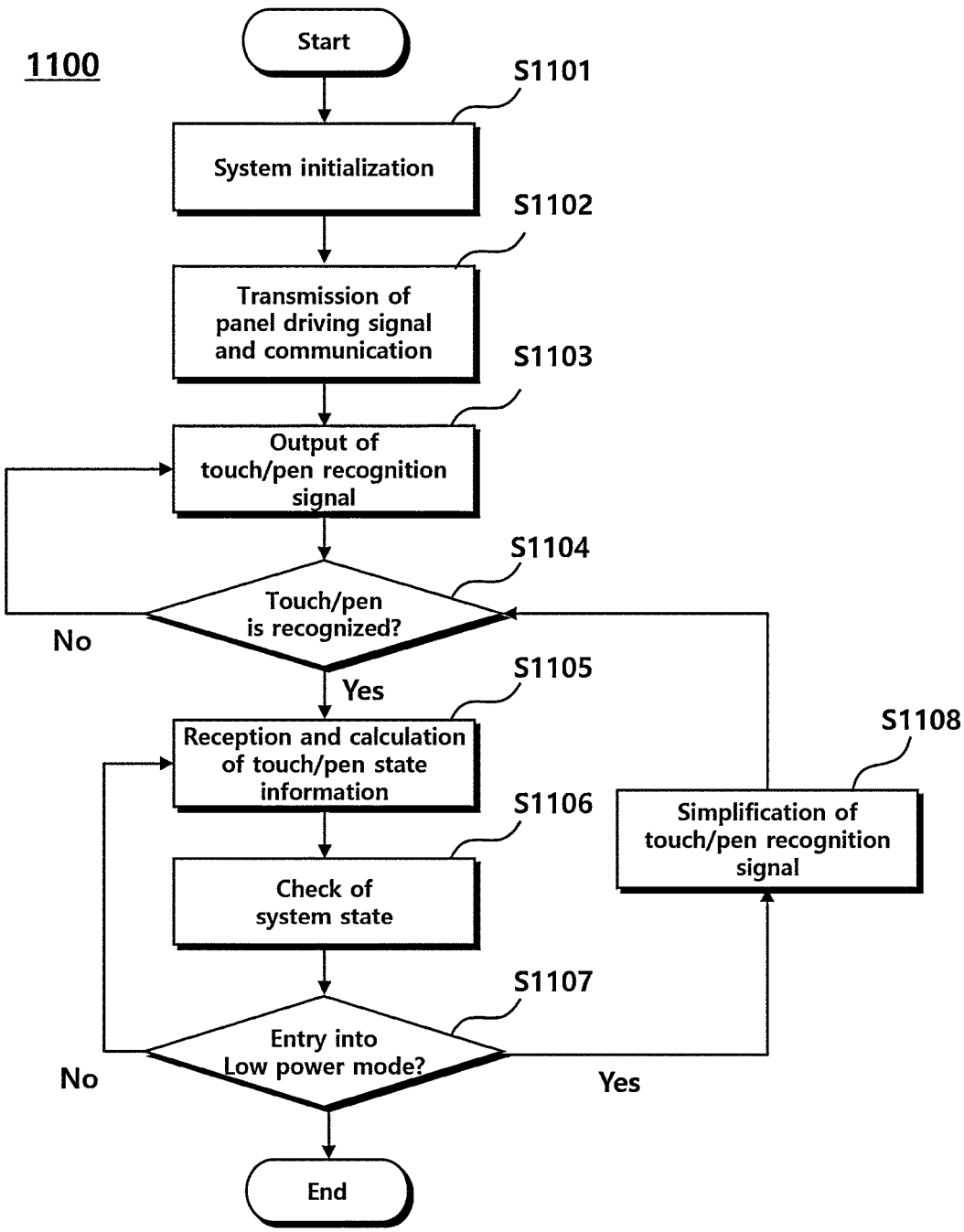
FIG. 13 is a diagram explaining operations by driving modes of a touch circuit according to an embodiment.

FIG. 13 is a diagram explaining operations by driving modes of a touch circuit according to an embodiment.

Referring to FIG. 13, an operation method 1100 by driving modes of the touch circuit may include steps of system initialization (S1101), outputting a driving signal of a panel and performing communication (S1102), outputting a touch/pen recognition signal (S1103), identifying whether the touch/pen is recognized (S1104), receiving and calculating touch/pen state information (S1105), system state checking (S1106), determining whether driving mode of the touch circuit is the low power mode (S1107), and simplifying the touch/pen recognition signal (S1108).

The system initialization step (S1101) may be a step of initializing the system as described above with reference to FIG. 12.

The step of outputting the driving signal of the panel and performing communication (S1102) may be a step of transferring the touch driving signal to the panel and performing communication.

The step of outputting the touch/pen recognition signal (S1103) may be a step of transferring an uplink signal to the object.

The step of identifying whether the touch/pen is recognized (S1104) may be a step of receiving a downlink signal of the object. Further, the step may be a step of receiving the touch sensing signal about the capacitance change according to the proximity of the object, and determining whether the touch/pen is recognized.

The step of receiving and calculating the touch/pen state information (S1105) may be a step of receiving the touch/pen state information from the data acquired in the step of identifying whether the touch/pen is recognized (S1104), and calculating the information in the form of necessary data.

The system state checking step (S1106) may be a step of checking the state of the system as described above with reference to FIG. 12.

The step of determining whether the driving mode of the touch circuit is the low power mode (S1107) may be a step of determining whether the driving mode of the touch circuit is the low power mode in accordance with the above-described basis with reference to FIG. 12 or another predetermined basis.

If the driving mode of the touch circuit is the normal mode, the step may return to the step of receiving and calculating the touch/pen state information (S1105), and may repeat the receiving and calculating the touch/pen state information.

If the driving mode of the touch circuit is the low power mode, the step of simplifying the touch/pen recognition information (S1108) may be performed.

The step of simplifying the touch/pen recognition information (S1108) may be the step of simplifying the communication protocol as described above with reference to FIGS. 10 and 11.

FIG. 14 is a diagram explaining a short-circuiting process between channels between touch electrodes of a touch circuit according to an embodiment.

Referring to FIG. 14, a short-circuiting method 1200 between channels of the touch circuit may include steps of transmitting data by a microprocessor (S1201), receiving data from a digital unit (S1202), commanding by a controller of the digital unit (S1203), changing the state of an internal switch of a touch panel (S1204), and short-circuiting the channel of the touch panel (S1205).

The step of transmitting data by the microprocessor (S1201) may be a step in which the microprocessor MCU generates data and transmits the data to an external integrated circuit (IC).

The microprocessor MCU may generate and transfer a signal for controlling the digital unit to the digital unit of a source driver integrated circuit (SRIC). The communication method between the microprocessor and the digital unit may be SPI communication.

The step of receiving the data by the digital unit (S1202) may be a step of receiving an external control signal or data.

The step of commanding by the controller of the digital unit (S1203) may be a step in which the controller (not illustrated) of the digital unit transfers and commands a control signal for changing the state of the switch (not illustrated).

The step of changing the state of the internal switch of the touch panel (S1204) may change the connection relationship between the touch electrodes corresponding to the controller (not illustrated). For example, the internal switch may selectively open or short-circuit the touch electrodes.

The step of short-circuiting the channel of the touch panel (S1205) may be a step in which the channel defined as the touch electrodes or touch electrode group is selectively short-circuited corresponding to the operation of the internal switch of the touch panel.

What is claimed is:

1. A touch circuit comprising:
   a touch driving circuit supplying touch driving signals to touch electrodes;
   a touch sensing circuit sensing capacitance changes of the touch electrodes through touch sensing lines; and
   multiplexers, respectively connected to the touch sensing lines, each transferring a capacitance change of a touch electrode to the touch sensing circuit,
   wherein some of the touch electrodes are selectively short-circuited depending on a driving mode of a touch circuit and the touch electrodes are electrically connected one with another through the connection of nodes of the touch electrodes,
   wherein the multiplexers include a first multiplexer and a second multiplexer,
   wherein the touch electrodes include a first touch group including a first plurality of touch electrodes and a second touch group including a second plurality of touch electrodes,
   wherein, in a first driving mode of the touch circuit, the first multiplexer is connected with the first plurality of touch electrodes of the first touch group, and the second multiplexer is connected with the second plurality of touch electrodes of the second touch group, and
   wherein, in a second driving mode of the touch circuit, the first multiplexer is connected with the first plurality of touch electrodes of the first touch group, the second multiplexer is not connected with the second plurality of touch electrodes of the second touch group, and each of the first plurality of touch electrodes is connected with corresponding each of the second plurality of touch electrodes, respectively.

2. The touch circuit according to claim 1, wherein, in the second driving mode of the touch circuit, the touch electrodes comprise a plurality of touch groups including the first and second touch groups, and the plurality of touch groups are connected with each other by internal switches therein and wires.

3. The touch circuit according to claim 1, wherein the first touch group and the second touch group are short-circuited in a case when the second driving mode of the touch circuit is a low power mode.

4. The touch circuit according to claim 1, wherein, in the first driving mode of the touch circuit, the multiplexers are respectively connected with a plurality of touch groups comprising touch electrodes and each multiplexer selects and outputs one of touch sensing signals transferred from the plurality of touch groups.

5. The touch circuit according to claim 1, wherein, in the first driving mode, the touch sensing lines are connected to the first and second multiplexers, and, in the second driving mode, the touch sensing lines that were connected to the second multiplexer in the first driving mode are disconnected from the second multiplexer.

6. The touch circuit according to claim 1, wherein a method of transferring the touch driving signals to the touch electrodes is changed depending on the driving mode of the touch circuit.

7. The touch circuit according to claim 1, wherein, when the driving mode of the touch circuit is the second driving mode, a signal received by the touch electrode is a signal for a position of an object.

8. The touch circuit according to claim 1, wherein the driving mode of the touch circuit is determined in accordance with a set value stored in the touch circuit and an operation of a switch determining a connection state of a touch electrode is changed in response to a change of the set value.

9. A method for controlling the touch circuit of claim 1, comprising:
   generating a control signal for switches disposed between a plurality of touch electrodes;
   transferring the control signal for switches to a readout circuit through a serial peripheral interface (SPI) communication method; and
   the readout circuit's selectively short-circuiting the plurality of touch electrodes in response to the control signal for switches.

10. The method according to claim 9, wherein the first and second multiplexers each selects and outputs a touch sensing signal to an external circuit, and
    wherein, in the second driving mode of the touch circuit, the method further comprises transferring the touch sensing signal to the first multiplexer through the touch sensing line connected between the first multiplexer and the first plurality of touch electrodes of the first touch group when the touch sensing signal is generated in the second plurality of touch electrodes of the second group.

11. The method according to claim 9, wherein the switches change their operation in response to the driving mode of the touch circuit and selectively short-circuits the plurality of touch electrodes when the driving mode of the touch circuit is the second driving mode.

12. The method according to claim 9, wherein a method of transferring a touch driving signal to the plurality of touch electrodes is changed in response to the control signal for switches.

13. The method according to claim 12, wherein, when the control signal for switches is for selectively short-circuiting the plurality of touch electrodes, the number of slots for transferring the touch driving signal to the plurality of touch electrodes is changed.

14. A touch circuit comprising:
- a touch driving circuit transferring touch driving signals to a first plurality of touch electrodes provided in a first touch group and a second plurality of touch electrodes provided in a second touch group through touch driving lines; and
- a touch sensing circuit receiving a touch signal transferred from one or more of the first plurality of touch electrodes and the second plurality of touch electrodes,
- multiplexers connected with a plurality of touch sensing lines connected to the touch sensing circuit each selecting and outputting one of signals transferred from the plurality of touch sensing lines,
- wherein a plurality of switches is disposed between the first plurality of touch electrodes provided in the first touch group and the second plurality of touch electrodes provided in the second touch group, respectively, and each of the plurality of switches selectively short-circuits between the first plurality of touch electrodes and the second plurality of touch electrodes, respectively, depending on a driving mode of a touch circuit,
- wherein, when the driving mode of the touch circuit is a low power mode, the multiplexers comprise a reference multiplexer connected to some of the plurality of touch sensing lines that are connected to the first plurality of touch electrodes provided in the first touch group and open multiplexers not connected to the plurality of touch sensing lines that are connected to the second plurality of touch electrodes provided in the second touch group,
- wherein, when the driving mode of the touch circuit is the low power mode, the each of the plurality of switches short-circuits between the first plurality of touch electrodes and the second plurality of touch electrodes, respectively, and each of the first plurality of touch electrodes is connected with corresponding each of the second plurality of touch electrodes, respectively, and
- wherein, when the driving mode of the touch circuit is the low power mode, a change in a charge amount of one or more of the first plurality of touch electrodes and the second plurality of touch electrodes is sensed through the reference multiplexer.

15. The touch circuit according to claim 14, wherein the each of the plurality of switches changes a state of connection between the first plurality of touch electrodes and the second plurality of touch electrodes, respectively, in response to a switch control signal of a microcontroller unit.

16. The touch circuit according to claim 14, wherein the each of the plurality of switches determines a short-circuit timing of the first plurality of touch electrodes and the second plurality of touch electrodes, respectively, in response to a timing of a control signal transferred through a serial peripheral interface (SPI) communication.

17. The touch circuit according to claim 14, wherein, when the driving mode of the touch circuit is changed from a normal mode to the low power mode, the number of slots used in one frame is changed.

18. The touch circuit according to claim 14, wherein, when the driving mode of the touch circuit is the low power mode, slots for pen data communication are changed to be off.

* * * * *